US007135664B2

(12) United States Patent
Vornsand et al.

(10) Patent No.: US 7,135,664 B2
(45) Date of Patent: Nov. 14, 2006

(54) METHOD OF ADJUSTING MULTIPLE LIGHT SOURCES TO COMPENSATE FOR VARIATION IN LIGHT OUTPUT THAT OCCURS WITH TIME

(75) Inventors: Steven J. Vornsand, Lake in the Hills, IL (US); Douglas M. Hamilton, Arlington Heights, IL (US)

(73) Assignees: Emteq Lighting and Cabin Systems, Inc., New Berlin, WI (US); Carmen Matthew, LLC, Carol Stream, IL (US)

( * ) Notice: Subject to any disclaimer, the term of this patent is extended or adjusted under 35 U.S.C. 154(b) by 78 days.

(21) Appl. No.: 10/935,802

(22) Filed: Sep. 8, 2004

(65) Prior Publication Data

US 2006/0049332 A1 Mar. 9, 2006

(51) Int. Cl.
*G01J 1/32* (2006.01)

(52) U.S. Cl. ........................................................ 250/205

(58) Field of Classification Search ................ 250/205, 250/226, 559.1; 362/231

See application file for complete search history.

(56) References Cited

U.S. PATENT DOCUMENTS 5,803,579 A 9/1998 Turnbull et al.
6,158,882 A 12/2000 Bischoff, Jr.
6,445,139 B1 * 9/2002 Marshall et al. ............ 315/291
6,633,301 B1 * 10/2003 Dallas et al. ............... 345/597
6,641,294 B1 11/2003 Lefebvre
6,769,792 B1 8/2004 Bornhorst
2004/0090787 A1 5/2004 Dowling et al.
2004/0105261 A1 6/2004 Ducharme et al.

OTHER PUBLICATIONS

A. Zukauskas et al., "Optimization of multichip white solid-state lighting source with four or more LEDs", *Solid State Lighting and Displays*. Proceedings of SPIE, vol. 4445 (2001).

* cited by examiner

*Primary Examiner*—Georgia Epps
*Assistant Examiner*—Pascal M. Bui-Pho
(74) *Attorney, Agent, or Firm*—George E. Haas; Quarles & Brady LLP

(57) ABSTRACT

A feedback method on occasion independently senses a characteristic of light produced by each of several light sources in a lighting apparatus. The sensed value of that characteristic is compared to a reference value for the respective light source and that light source's operation is adjusted accordingly. This method has particular application in a lighting apparatus that produces different lighting effects by varying the intensity of different colors of light produced by the various light sources. The feedback method compensates for light emission variation as the sources age, thus ensuring that the lighting apparatus continues to produce the desired lighting effects. This enables multiple lighting apparatus in an area to be calibrated to the same standard so that uniform illumination is provided.

18 Claims, 4 Drawing Sheets

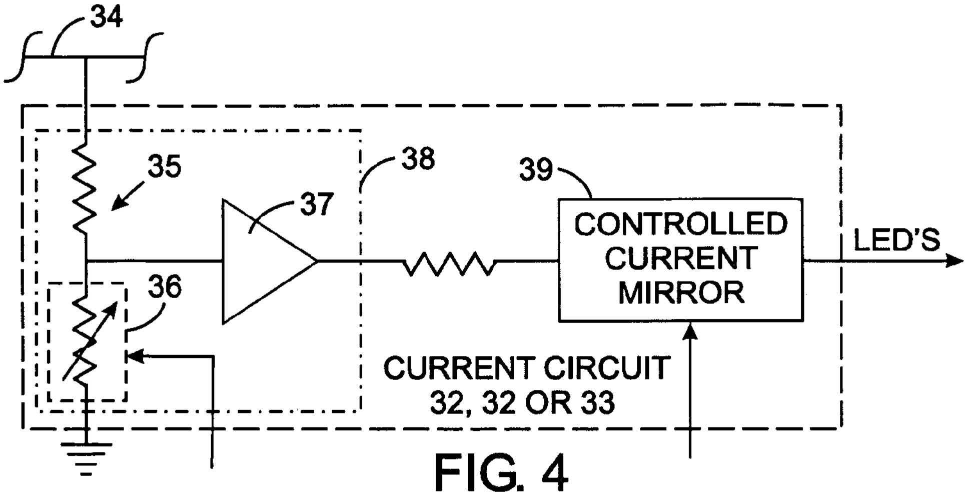
FIG. 4
FIG. 5
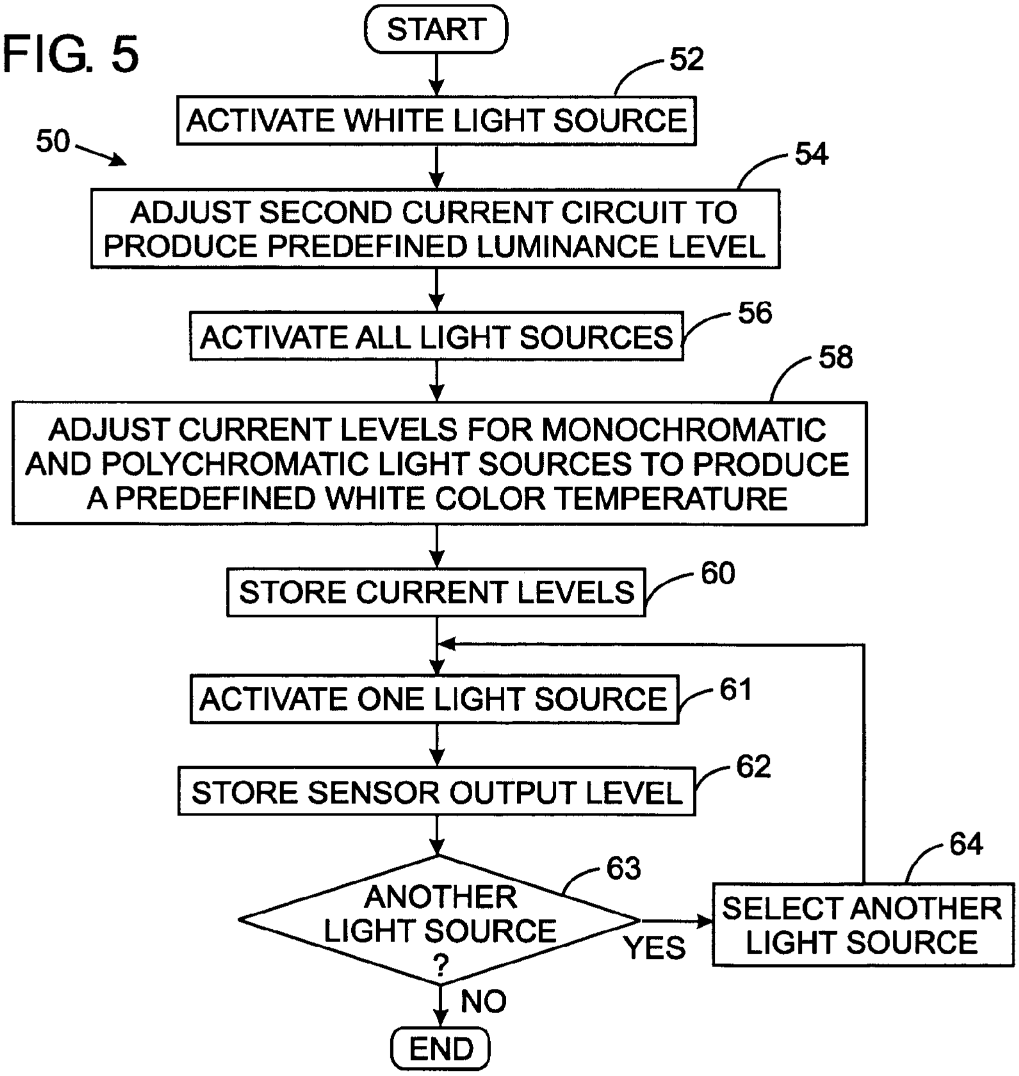

METHOD OF ADJUSTING MULTIPLE LIGHT SOURCES TO COMPENSATE FOR VARIATION IN LIGHT OUTPUT THAT OCCURS WITH TIME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to lighting apparatus which produce white light that is variable within a predefined range of correlated color temperatures, and more particularly to such lighting apparatus that employ a plurality of light sources each emitting light of a different color which blend together to produce the white light.

2. Description of the Related Art

The interior spaces, such as those of buildings and vehicles, historically were illuminated by incandescent or fluorescent lighting devices. More recently lighting systems have been developed that utilize groups of a light emitting diodes (LED's). For example U.S. Pat. No. 6,158,882 describes a vehicle lighting system which employs a plurality of LED's mounted in a linear array to form a lighting strip. By varying the voltage applied to the lighting device, the intensity of the illumination can be varied to produce a desired environmental effect. For example, it is desirable to control the illumination intensity and color of the passenger cabin of executive aircraft and custom motor coaches to accent or emphasize the cabin decor and to set different environmental moods for the occupants. Subtle changes in the shade of white light can have a dramatic effect on the interior environment of those vehicles.

One technique for characterizing white light is correlated color temperature based on the temperature in degrees Kelvin of a black body that radiates the same color light. An ideal model of a white light source is referred to as a "Planckian radiator". The loci of the chromaticities of different Planckian radiators form a curve on the chromaticity chart of the Commission Internationale de l'Eclairage (CIE) in Vienna, Austria, which characterizes colors by a luminance parameter and two color coordinates x and y.

Another characterizing technique measures the color rendering properties of a light source based on the degree to which reference colors are shifted by light from that source. The result of this characterization is a numerical Color Rendering Index (CRI) having a scale from 0 to 100, with 100 being a perfect source spectrally equal to sunlight or full spectrum white light. In general, light sources with a CRI between 80 and 100 make people and objects look better and tend to provide a safer environment than light sources with lower CRI values. Typical cool white fluorescent lamps have a CRI of 65 while rare-earth phosphor lamps have a CRI of 80 and above.

Some prior variable lighting systems contain several emitters that create light of different colors which mix to produce an resultant illumination color. The most common of these systems utilize red, green, and blue light sources driven at specific excitation levels to create an equivalent "white" light balance point. However, it is difficult with prior lighting systems to create white light that adheres to the Planckian radiator curve on the CIE chromaticity chart and has a CRI greater than 80.

Other variable lighting systems in common use utilize a broad spectrum "white" light source, along with individual red, green and blue light sources. The "white" light spectrum is then shifted on the color chart by amounts related to the contributions of the individual red, green, and blue light levels with respect to the level of the broad spectrum light source level and to each other. Although this type of lighting apparatus can replicate the Planckian radiator over a range in the visible spectrum of light, it has a poor Color Rendering Index over most of that range.

In order to illuminate an entire room or the passenger cabin of an aircraft, the lighting system must employ numerous light sources and different areas may be illuminated by different lighting systems. Even where all the sources are commonly controlled, various ones may produce different shades of white light. Thus it is difficult to provide a uniform color of light throughout the interior space.

Therefore, it is desirable to provide a lighting system which permits the color temperature of a broad spectrum light to be varied within a predefined range in a controlled manner. It is further desirable to provide a mechanism that automatically calibrates each light source to consistently produce light at a predefined correlated color temperature, thereby compensating for changes that occur as the source ages over time.

SUMMARY OF THE INVENTION

A lighting apparatus has a plurality of light sources each producing different colored light which combine to produce a resultant color of light from the apparatus. For example, the lighting apparatus may include a white light source, a monochromatic light source and a polychromatic light source. A method is provided to occasionally adjust the operation of each light source to ensure that the desired resultant color is produced as the sources age.

That method comprises defining a separate reference value for a characteristic of the light produced by each light source. For example, the characteristic may be light luminance, although a different characteristic may be used for each light source. The characteristic of the light produced by each light source is sensed independently, which produces a sensed value for each light source. Then, each sensed value is compared to the associated reference value and the operation of respective light source is adjusted, if necessary, based on the comparing. Preferably, a given light source's operation is adjusted until its sensed value substantially equals the respective reference value. That adjustment may involve altering the amount of electric current that flows to the respective light source, for example.

In a preferred embodiment of the method, the reference values are defined by first setting the luminance of the white light source to a predefined level. Then operation of the other light sources are independently adjusted until the resultant color of light has a predefined correlated color temperature. At that time, the characteristic of the light produced by each light source is sensed, thereby producing the reference values for the light sources.

BRIEF DESCRIPTION OF THE DRAWINGS

FIG. 4 is a schematic circuit diagram of a current controller in FIG. 3;

FIG. 5 is a flowchart of a process performed in the factory to calibrate the lighting strip to produce white light at a predefined correlated color temperature;

DETAILED DESCRIPTION OF THE INVENTION

Figure 1:
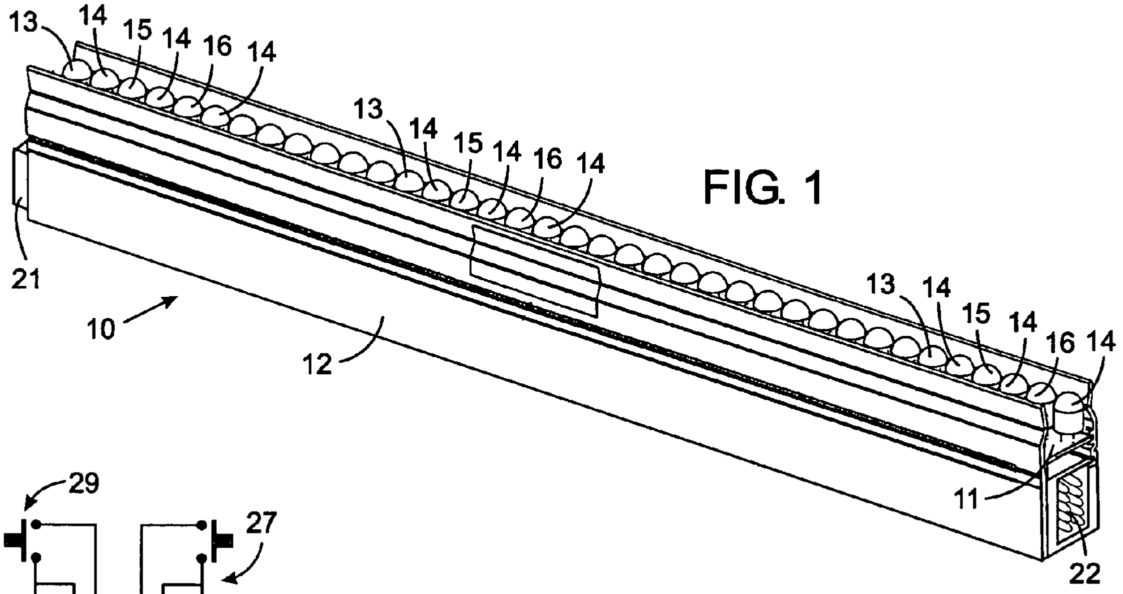
FIG. 1 is an isometric view of an LED lighting strip that is part of a lighting system according to the present invention.

With initial reference to FIG. 1, a lighting strip 10 includes a housing 12 in with a U-shaped channel which supports longitudinal edges of a printed circuit board 11. A plurality of light emitting diodes (LED's) 13, 14, 15 and 16 are mounted along a row that extends longitudinally on the printed circuit board 11. The first type of LED's 13, which preferably emit red light, collectively form a monochromatic light source 17. As used herein a monochromatic light source emits light in which 90% of the energy is concentrated within a spectral wavelength width of a few angstroms. The second type of LED's 14 emit white light and create a broad spectrum light source 18. For example, each second type of LED 14 emits blue light that strikes a phosphor coating which produces white light of a correlated color temperature greater than 6500° Kelvin. The third type of LED's 15 preferably emits amber light and fourth type of LED's 16 preferably emits green light. The third and fourth types LED's 15 and 16 combine to form a polychromatic light source 18 which is defined herein as a source that emits light having at least two distinct wavelengths. As will be described, the third and fourth types of LED's 15 and 16 are driven in unison, i.e. identically, and thus form a single light source. The different types of LED's are arranged in an alternating pattern in which the second type of LED 14, that emits broad spectrum light, is located between the other types of LED's. In the embodiment shown in FIG. 1, a red first type of LED 13 is followed by a white second type of LED 14 going along the row. Next there is an amber third type of LED 15, then another white second type of LED 14 followed by a green fourth type of LED 16, with the series concluding with yet another white second type of LED 14. The series pattern of six LED's repeats over and over again along the length of the a lighting strip 10. Other repeating patterns of the six LED's may be used. Although the present invention is being described in the context of a system that uses light emitting diodes, other types of emitters can be utilized as the monochromatic, broad spectrum and polychromatic light sources.

Figure 2:
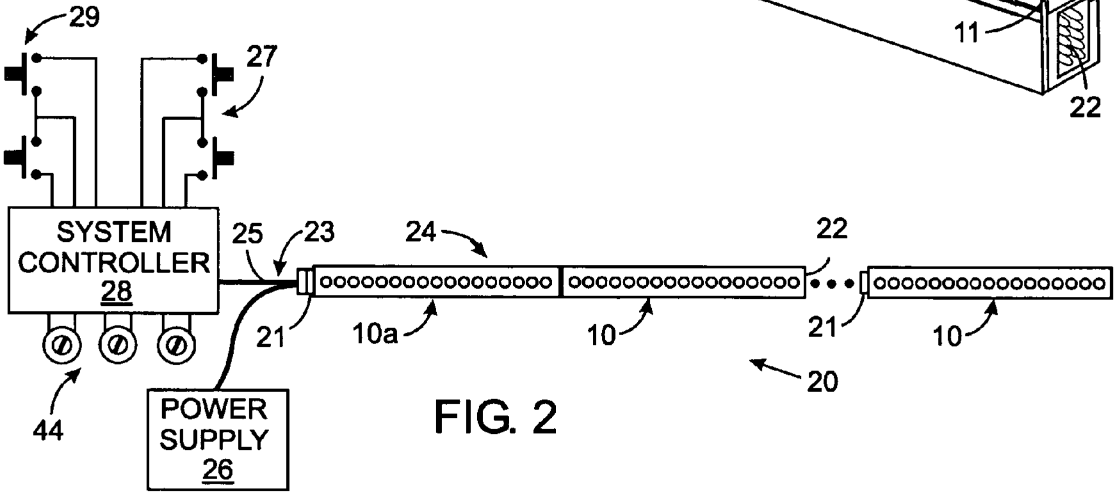
FIG. 2 is a schematic circuit diagram of the lighting system in which several LED lighting strips are connected to a controller and a power supply.

The lighting strip 10 has a first electrical connector 21 at one end and a mating second electrical connector 22 at the opposite end. Thus a plurality of lighting strips 10 can be connected in a daisy chain 24 by inserting the first electrical connector 21 of one lighting strip into the second electrical connector 22 of a another lighting strip and so on to create a lighting system 20 as illustrated in FIG. 2. The connectors 21 and 22 carry control data and power between the lighting strips 10 connected in this manner. This chain of multiple lighting strips 10 can be used to illuminate a large space, such as by installing the lighting strips along the length of the passenger cabin of an airplane, for example.

An exposed electrical connector 21 of the lighting strip 10*a* at one end of the daisy chain 24 receives a mating connector on a cable 23 that carries electrical power from a power supply 26 and control commands on a communication bus 25 from a system controller 28. A first pair of pushbutton switches 27 is connected to the system controller 28 by which a user is able to increase and decrease shade of the white light produced by the chain 24 of lighting strips 10. A second pair of pushbutton switches 29 enables the user to increase and decrease the luminance (brightness) of the light. The system controller 28 includes a microcomputer that executes a software program which supervises the operation of the lighting system 20 and sends control commands to the lighting strips 10, as will be described.

Figure 3:
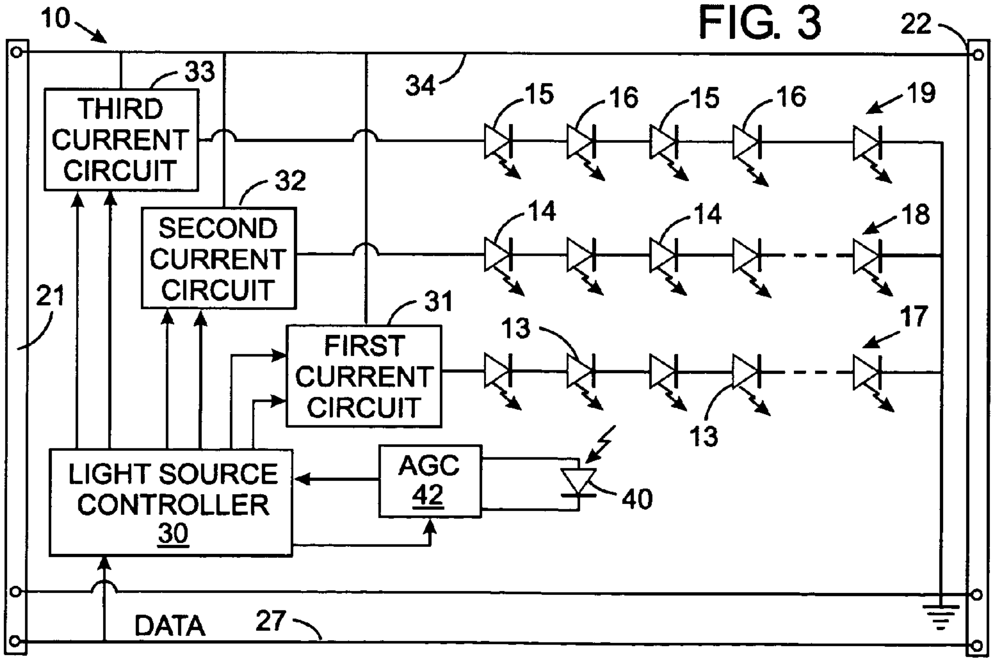
FIG. 3 is a schematic circuit diagram of the lighting strip.

Within a given lighting strip 10, the LED's of each light source are electrically connected together in a separate circuit branch from the other sources as shown in FIG. 3. Specifically all the first type of LED's 13 are coupled in series to form a circuit branch for the monochromatic light source 17 and all the second type of LED's 14 are serially connected in a circuit branch of the broad spectrum light source 18. The third and fourth types of LED's similarly are connected in series with one another to form a common circuit branch for the polychromatic light source 19. This interconnection enables each of the three light sources 17–19 to be controlled independently, as will be described.

Application of electricity to the light sources 17–19 is governed by a microcomputer based, light source controller 30 that responds to the control commands received from the system controller 28. Operation of the lighting strip 10 is controlled by a software program that is stored in a memory and executed by the light source controller 30. The light source controller 30 operates first, second and third current circuits 31, 32 and 33 which supply electric current to the first, second and third light sources 17, 18 and 19, respectively. The details of one of the current circuits 31–33 is shown in FIG. 4 and has a voltage divider 35 connected between circuit ground and a power conductor 34 to which the power supply 26 attaches. The voltage divider 35 includes a digitally controlled potentiometer 36 that adjusts a variable voltage level which is applied to an input of a voltage-to-current converter 37. The voltage divider 35 and the voltage-to-current converter 37 form a variable current source 38. The digitally controlled potentiometer 36 and thus the variable voltage level are controlled by a frst signal from the light source controller 30. The variable voltage level results in a variable output current being produced by the voltage-to-current converter 37. That output current is fed to a controlled current mirror 39 that acts as a driver which switches the electric current to the respective light source 17, 18 or 19 and its LED's. Switching of the current mirror 39 is controlled by a pulse width modulated (PWM) second signal from the light source controller 30. The duty cycle of the PWM second signal determines the effective magnitude of the electric current that is applied to the respective LED light source and thus controls the luminance of the light output.

Referring again to FIG. 3, a light sensor 40 is located at a position on the light strip 10 so as to receive light from all four types of LED's 13–16. The light sensor 40 produces an output signal indicating the intensity of the light that impinges thereon. That signal is processed by an automatic gain control (AGC) circuit 42 to provide an amplified sensor signal to an analog input of the light source controller 30. In a calibration mode to be described, each light source 17–19 is activated individually and the resultant light is sensed. Because the different types of LED's inherently produce light at different intensity levels when driven by the same magnitude of current, the gain of the AGC circuit 42 is varied depending upon which source 17–19 is being calibrated. Specifically the gain is increased for the types of LED's that generate lower intensity light levels.

The operation of the lighting strip 10 is initially calibrated at the factory by connecting one lighting strip to a power supply 26 and a system controller 28 similar to that illustrated in FIG. 2. A spectrophotometer (not shown) is positioned to receive light emitted by all the light sources 17–19. The calibration process is depicted by the flowchart of FIG. 5 and commences at step 52 by the system controller 28 activating only the broad spectrum light source 17 that produces white light. Specifically the system controller 28 sends a command via the communication bus 25 to the light source controller 30 within the lighting strip 10 being calibrated. The command instructs the light source controller 30 to operate the broad spectrum light source 17 (i.e. white LED's 14) at a default current level and PWM duty cycle (e.g. 50%). At step 54, current from the second current circuit 32 for that light source 17 is adjusted until the spectrophotometer indicates a predefined reference luminance level. That current level variation is accomplished by a technician adjusting a corresponding one of three system controller calibration potentiometers 44. The system controller 28 responds a change of the calibration potentiometer by sending another current level command to the light source controller 30 in the lighting strip 10. The light source controller 30 carries out the command by changing operation of the digital potentiometer 36 in the second current circuit 32 to vary the current magnitude accordingly.

Figure 6:
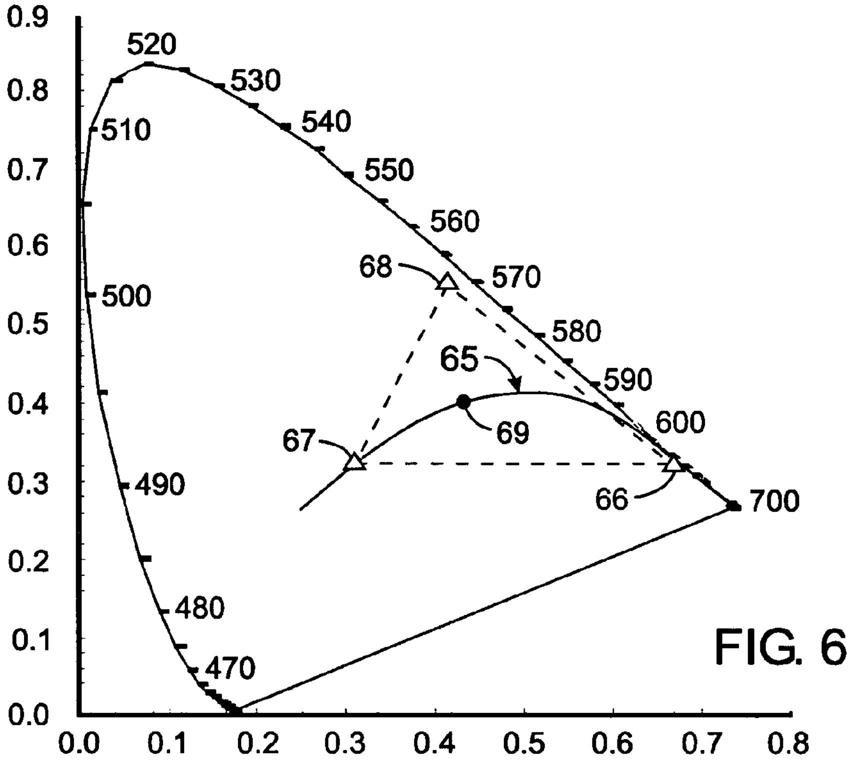
FIG. 6 is the CIE chromaticity chart for the lighting strip.

After the luminance level of the broad spectrum light source 17 (i.e. white LED's 14) has been set to the reference level, the system controller 28 activates all the light sources 17–19 at step 56. The light sources are driven by PWM signals which initially have equal duty cycles (e.g. 50%). The spectrophotometer then is observed while manually adjusting the operation of the current circuits 31 and 33 for the first and third light sources 17 and 19, i.e. the red LED's 13, and the combination of green and amber LED's 15 and 16. The current levels of the first and third current circuits 31 and 33 are varied until the spectrophotometer indicates that the light which results from the mixture of light from the three sources 17–19 has a predefined correlated color temperature. Specifically, a calibration reference point is chosen on the curve 65 which corresponds to a Planckian radiator on the standard CIE chromaticity chart as illustrated in FIG. 6. The current levels of the first and third current circuits 31 and 33 are varied by the technician adjusting the other two calibration potentiometers 44 in FIG. 2. The system controller 32 responds by sending the appropriate current level commands over the communication bus 25 to the light source controller 30, which alters the operation of the digital potentiometer 36 within the respective current circuit 31 or 33. Adjustment of the first light source 17, the red LED's, varies the chromaticity along the X axis of the CIE chromaticity chart, while adjustment of the third light source 17, the amber and green LED's, varies the chromaticity along the Y axis. Thus, the system controller 32 enables orthogonal control of the light emitted by the lighting strip.

Once the lighting strip has been calibrated to produce light at the predefined white correlated color temperature at step 58, the current level settings for the current circuits 31–33 are stored at step 60 in the memory of the light source controller 30. These settings define the color temperatures of the three light sources 17–19. With reference to the CIE chromaticity chart in FIG. 6, the chromaticity of the red light from the monochromatic light source 17 and the first type of LED's 13 is denoted by point 66 and the shade of white light produced by the broad spectrum light source 18 and the second type of LED's 14 is indicated by point 67. Point 68 represents the chromaticity of the polychromatic light source 19 comprising the third and fourth types of LED's 15 and 16 and represents an averaging of the individual wavelengths of the light from those LED types. If more that two types of emitters are used for the polychromatic light source, the resultant chromaticity point also will be an average of their individual wavelengths. Point 69 indicates the chromaticity of the resultant light from the mixture of light from the three light sources 17–19.

Then at step 61, each LED light source 17, 18 and 19 is activated to full luminance one at a time and the output of sensor 40 is stored within the memory of the light source controller 30 at step 62. This process stores reference sensor values for each light source for use subsequently during recalibration of the lighting strip 10, as will be described. A determination is made at step 63 whether all three light sources have been sensed. If not the next light source is selected at step 64 and the process returns to step 61 to sense and store that light source's light output level. After a light output level has been stored for each light source, the factory calibration process terminates.

FIG. 2 depicts a typical a lighting system 20 in which a plurality of individual lighting strips 10 are connected together and controlled in unison. The communication bus 25 passes through every strip and each of their respective light source controllers 30 listens and responds to the commands transmitted by the system controller 28. Those commands instruct every light source controller 30 how to adjust the relative intensity of each light source 17, 18 and 19.

This command transmittal process enables the user to vary the shades of white light produced by the combination of light from each light source 17–19 within every strip. By activating one of the pushbutton switches 27 in FIG. 2, the user is able to increase or decrease the correlated color temperature of the combined light along the curve 65 for a Planckian radiator on the CIE chromaticity chart in FIG. 6. A look-up table correlates locii on the Planckian radiator curve 65 to the relative intensities of the light produced by each source 17, 18 and 19 of the lighting strip 10, i.e. the intensities of the monochromatic light, the broad spectrum light and the polychromatic light. Those relative light intensities are defined by PWM duty cycles for each of the three light sources. Changing the duty cycle of the PWM signals that are applied to the current mirrors 39 in one or two current circuits 31–33, alters the relative intensity of light from the LED light sources thereby varying the correlated color temperature of the combined light produced from the lighting strip 10. For example, increasing the PWM duty cycle of the monochromatic light source 17 in the exemplary system, increases the intensity of the red light without affecting the intensity of light from the other two sources 18 and 19. The addition of more red light yields warmer combined light.

The user also can vary the overall brightness of the combined light by operating one of the other pair of pushbutton switches 29 which increases or decreases the PWM duty cycles for each current circuit 31–33 by the same amount. Thus the intensity relationship of the light from the light sources 17–18 is maintained constant, that is change in color occurs while the combined luminance varies.

The light from the three sources 17–19 mix to produce a resultant shade of white light having a correlated color temperature that can be adjusted along the Planckian radiator curve 65. Proper control of the relative intensity of the light from each source 17–19, enables the lighting strip to replicate the light from Planckian radiators through a substantially continuous range of color temperatures, from 2700° K to 6500° K, for example. The degree to which the variation of the color temperature is continuous is a function of the resolution at which the relative intensity of the light 17–19 can be varied.

Figure 7:
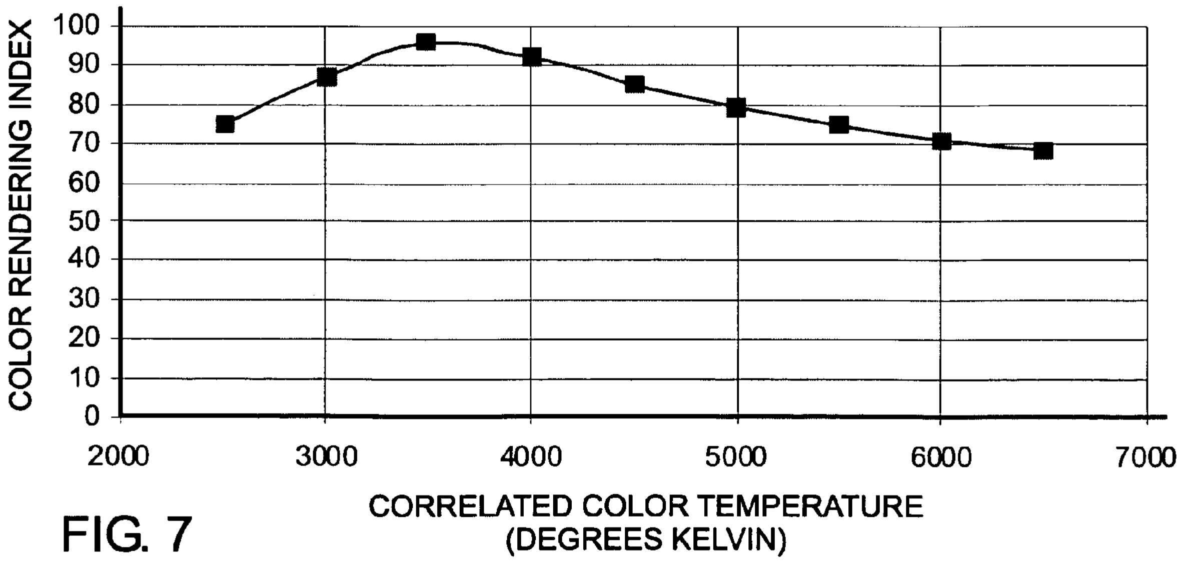
FIG. 7 is a graph depicting the color rendering index throughout the spectrum of the combined light produced by the lighting strip.

FIG. 7 graphically depicts the color rendering index (CRI) of the resultant shade of white light, produced when the light from the three light sources mix. A substantial amount of the visible spectrum produced by the lighting strip, at least 80% the 2700° K to 6500° K range of color temperatures, has a color rendering index of at least 80. This results from the use of a broad spectrum light source 18 that produces white light the of which is shifted by the monochromatic and polychromatic light from the other two light sources 17 and 19.

Over time, the light emitting diodes age causing a change in the color temperature of the produced light. Therefore, the combined light deviates from the locii of correlated color temperatures along the Planckian radiator curve 65 on the CIE chromaticity chart. Change of individual light sources also alters the correlated color temperature of the combined light from each lighting strip 10. As a consequence, the shade of the white combined light produced varies from lighting strip to lighting strip in a lighting system 20 and no longer uniformly illuminates the adjacent area.

The present lighting system 20 provides a mechanism by which the individual lighting strips 10 are automatically recalibrated. Such recalibration can occur either whenever power is initially applied to the lighting strip, in response to a command from the system controller 28, or upon the occurrence of another trigger event.

Figure 8:
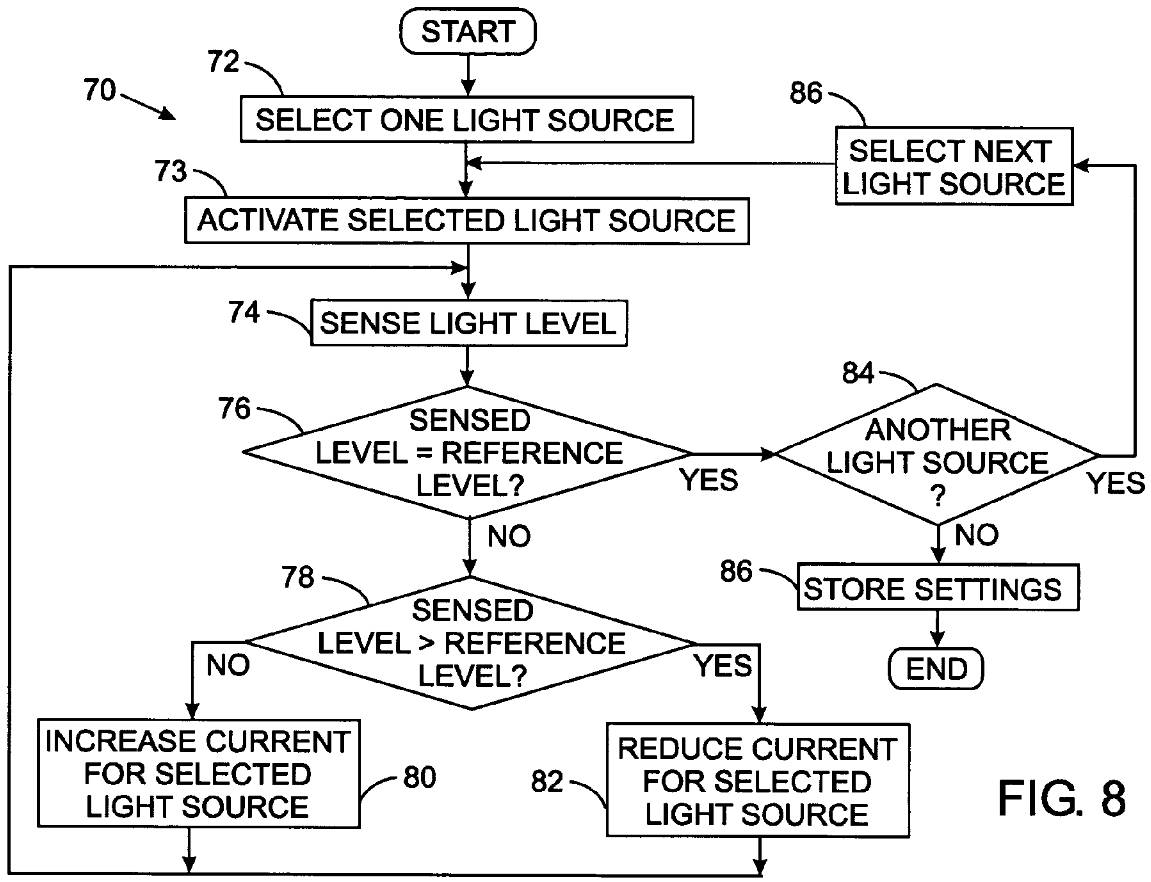
FIG. 8 is a flowchart of a recalibration process performed by each lighting strip.

The light source controller 30 within each lighting strip 10 responds to the occurrence of the trigger event by executing a recalibration software routine 70 depicted in FIG. 8. The recalibration process commences at step 72 where one light source, the monochromatic source 17 for example, is selected and then activated at step 73. At this time, only the LED's 13 in the selected light source emit light and those LED's are driven to their full intensity. Then, at step 74, the light source controller 30 reads the input signal from the automatic gain control circuit 42 which represents the light level detected by the sensor 40. The sensed light level is compared to the reference level for the selected light source that was stored in memory during the factory calibration of the lighting strip. If at step 76, the determination is made that the two light levels are not equal, the program execution branches to step 78 where a decision is made whether or not the sensed light level is greater than the reference light level. If not, the program execution branches to step 80 where the current produced by the first current circuit 31, in this case, is increased an incremental amount in an attempt to equalize the sensed level to the reference level. Alternatively, if at step 78, the sensed light level is greater than the reference light level, the program execution branches to step 82 where the magnitude of current from the first current circuit 31 is reduced. The program execution then returns to step 74 to once again sense the actual light level produced by the first selected light source. This procedure continues to loop through steps 74–82 until the sense level of light equals the reference light level at step 76.

Upon that occurrence, the program execution branches to step 84 where a determination is made whether another light source needs to be recalibrated. If so, the program execution branches through step 86 where the next light source is selected and then the program returns to step 73 to energize the LED's of that light source. When all three light sources 17–19 have been recalibrated, the program execution saves the new current magnitude settings at step 86 before terminating.

The recalibration method restores the lighting strip 10 to the operational level and performance that existed upon its manufacture so that the entire lighting system 20. will uniformly illuminate the area with a desired shade of white light. In other words, all the individual lighting strips 10 will produce the same shade of white combined light.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. For example, although light emitting diodes are used in the preferred embodiment, other types of light emitters could be used. Accordingly, the scope of the invention should be determined from the following claims and not limited by the above disclosure.

The invention claimed is:

1. A method for calibrating a lighting system for illuminating a space in response to a control command specifying an illumination color for the space, wherein the system has a plurality of light emission apparatus each having a plurality of light sources producing different colored light, said method comprising for each of the plurality of a light emission apparatus:

defining a separate reference value for a characteristic of light produced by each light source wherein such defining comprises adjusting operation of the plurality of light sources until a combination of the light produced by the plurality of light sources has a predefined correlated color temperature, and sensing the characteristic of the light produced by each light source and thereby producing a reference value for each light source;

sensing the characteristic of the light produced by each light source and thereby producing a sensed value for each light source;

for each light source, comparing the respective sensed value to the respective reference value; and adjusting operation of each light source as necessary based on the comparing;

thereby calibrating each of the plurality of light emission apparatus so that combined light from the plurality of light sources has the illumination color.

2. The method as recited in claim 1 wherein the characteristic of the light is light intensity.

3. The method as recited in claim 1 wherein operation of each light source is adjusted until the respective sensed value substantially equals the respective reference value.

4. The method as recited in claim 1 wherein adjusting operation of each light source comprises altering an amount of electric current that flows to the respective light source.

5. A method for calibrating a lighting system for illuminating a space in response to a control command specifying an illumination color for the space, wherein the system has a plurality of light emission apparatus each having a plurality of light sources producing different colored light including a first light source that produces white light, said method comprising for each of the plurality of a light emission apparatus:

defining a separate reference value for a characteristic of the light produced by each light source wherein such defining comprises setting luminance of the first light source to a predefined level, adjusting operation of the plurality of light sources other than the first light source until a correlated color temperature of a combination of light produced by the plurality of light sources has a predefined value, and sensing the characteristic of the light produced by each light source and thereby producing a reference value for each light source;

sensing the characteristic of the light produced by each light source and thereby producing a sensed value for each light source;

for each light source, comparing the respective sensed value to the respective reference value; and adjusting operation of each light source as necessary based on the comparing;

thereby calibrating each of the plurality of light emission apparatus so that combined light from the plurality of light sources has the illumination color.

6. A method for calibrating a lighting system for illuminating a space in response to a control command specifying an illumination color for the space, wherein the lighting system has a plurality of light emission apparatus each having a first light source and a second light source each producing light of a different color which combine during an operating mode of the light system, said method comprising for each of the plurality of a light emission apparatus:

(a) adjusting operation of the first and second light sources until a correlated color temperature of a combination of light produced by both light sources has a predefined value;

(b) defining a first reference value by sensing a characteristic of the light produced by the first light source;

(c) defining a second reference value by sensing the characteristic of the light produced by the second light source;

(d) defining the first light source as a selected light source;

(e) operating only the selected light source;

(f) sensing the characteristic of the light produced by the selected light source and thereby producing a sensed value;

(g) selecting either the first reference value as a selected reference value when the first light is the selected light source or the second reference value as a selected reference value when the second light is the selected light source;

(h) comparing the sensed value to the selected reference value;

(i) adjusting operation of the selected light source until the sensed value has a predefined relationship to the selected reference value;

(j) defining the second light source as a selected light source; and (k) repeating steps (e) through (i);

thereby calibrating each of the plurality of light emission apparatus so that combined light from the plurality of light sources has the illumination color.

7. The method as recited in claim 6 wherein the characteristic of the light produced by the first light source and second light source is light intensity.

8. The method as recited in claim 6 wherein adjusting operation of the selected light source comprises altering a magnitude of electric current that flows to the selected light source.

9. A method for calibrating a light emission apparatus having a first light source that produces white light, a second light source that produces a first color of light, and a third light source that produces a third color of light, said method comprising:

operating the first light source to produce light at defined luminance level which is a first reference level;

adjusting operation of the second light sources and the third light source until a correlated color temperature of a combination of light produced by all light sources has a predefined value;

sensing a first characteristic of light produced by the second light source, thereby producing a second reference value;

sensing a second characteristic of light produced by the third light source, thereby producing a third reference value;

thereafter:

sensing luminance of light produced by the first light source, thereby producing a first sensed value;

comparing the first sensed value to the first reference value;

adjusting operation of the first light source in response to comparing the first sensed value;

sensing the second characteristic of light produced by the second light source, thereby producing a second sensed value;

comparing the second sensed value to the second reference value;

adjusting operation of the second light source in response to comparing the second sensed value;

sensing the third characteristic of light produced by the third light source, thereby producing a third sensed value;

comparing the third sensed value to the third reference value; and adjusting operation of the third light source in response to comparing the third sensed value.

10. The method as recited in claim 9 wherein the second and third characteristics are light intensity.

11. The method as recited in claim 9 wherein operation of each light source is adjusted until the respective sensed value substantially equals the respective reference value.

12. The method as recited in claim 9 wherein adjusting operation of each light source comprises altering an amount of electric current that flows to the respective light source.

13. The method as recited in claim 9 wherein the second light source emits monochromatic light.

14. The method as recited in claim 9 wherein the second light source emits red light.

15. The method as recited in claim 9 wherein the second light source emits polychromatic light.

16. The method as recited in claim 9 wherein the second light source emits amber-green light.

17. The method as recited in claim 1 being performed periodically during operation of the lighting system.

18. The method as recited in claim 6 wherein steps (c) through (j) are performed periodically during operation of the lighting system.

* * * * *